United States Patent [19]

Kolodjski

[11] Patent Number: 4,503,706

[45] Date of Patent: Mar. 12, 1985

[54] CONSTANT TEMPERATURE ANEMOMETER

[75] Inventor: Kenneth J. Kolodjski, 2102 Como Ave. SE., Minneapolis, Minn. 55414

[73] Assignee: Kenneth J. Kolodjski, Minneapolis, Minn.

[21] Appl. No.: 495,034

[22] Filed: May 16, 1983

[51] Int. Cl.$^3$ .............................................. G01F 1/68
[52] U.S. Cl. ................................................. 73/204
[58] Field of Search ............... 73/27 R, 204; 323/365, 323/366, 367; 324/DIG. 1; 374/168

[56] References Cited

U.S. PATENT DOCUMENTS

| | | | |
|---|---|---|---|
| 2,389,615 | 11/1945 | Eder | 73/204 |
| 2,591,195 | 4/1952 | Picciano | 73/204 |
| 2,720,108 | 10/1955 | Johnson | 73/27 R |
| 3,085,431 | 4/1963 | Yerman et al. | 73/204 |
| 4,164,862 | 8/1979 | Jackson | 73/27 R |
| 4,214,478 | 7/1980 | Lauterbach | 73/204 |

OTHER PUBLICATIONS

DISA Information dated May 1971, p. 38 entitled "New Improvements in Anemometry Instruments".
DISA Information dated May 1971, p. 39, entitled "Description of the Individual Units".
DISA Information dated May 1971, p. 42, entitled "Improvements in Frequency Response".
Journal of Fluids Engineering, Dec. 1976, entitled "A Simple Linearized Hot-Wire Anemometer", pp. 749-752.
Department of Civil Engineering, Colorado State University entitled "A Dual-Amplifier Hot-Wire Anemometer".
von Karman Institute for Fluid Dynamics entitled "Theory and Design of a Constant Temperature Linearized Hot Wire Anemometer" dated Oct. 1974.
Department of Aerospace Engineering Sciences, University of Colorado, paper entitled "Analysis of a New Hot-Wire Anemometer with Shaped Bridge Impedance", 1982.
Department of Aerospace Engineering Sciences, University of Colorado entitled "Off-Optimum Operation of Constant Temperature Hot-Wire Anemometers" dated, 1982.

*Primary Examiner*—Herbert Goldstein
*Attorney, Agent, or Firm*—Schroeder, Siegfried, Vidas & Arrett

[57] ABSTRACT

A constant temperature anemometer wherein a bridge circuit having four legs includes a sensor in one leg and resistances in the other legs. The resistance of two of the legs is formed, at least in part, by a potentiometer which allows a simultaneous adjustment of the resistance of those legs and, accordingly, the ratio of those resistances. The potentiometer may be selectively connected within the bridge circuit or, alternatively, with other circuitry to determine the operating resistance of the sensor.

5 Claims, 3 Drawing Figures

CONSTANT TEMPERATURE ANEMOMETER

BACKGROUND OF THE INVENTION

Constant temperature anemometers or CTAs are known to the prior art. In such devices, a heated resistance element serves as a sensing element in a wind tunnel. The sensing element has a temperature coefficient of resistance and is maintained at constant resistance and, thus, temperature.

Typical prior art constant temperature anemometers place the sensor in one leg of a bridge circuit with a feedback circuit, including an amplifier, being employed to maintain balance on the bridge. An example of such an anemometer is illustrated in FIG. 1, wherein the sensing element or sensor is designated at 10 and forms one leg of a bridge, the other bridge legs being formed by resistances 11 through 13. An operational amplifier 14 has its inputs and outputs interconnected with the bridge.

The bridge leg of sensor 10 may be considered to be serially connected with the leg of resistance 11 with the junction between them being connected to the inverting input of the amplifier 14. Similarly, the leg of resistance 12 may be considered as serially connected with the leg of resistance 13 with the junction between them being connected to the non-inverting input to operational amplifier 14. The serially connected sensor 10 and resistance 11 are connected in parallel with the serially connected resistances 12 and 13, with the junction between the leg of resistance 11 and the leg of resistance 12 being connected to the output of the operational amplifier 14. The junction between the leg of sensor 10 and the leg of resistance 13 is connected to ground.

SUMMARY OF THE INVENTION

The circuit elements, and their interconnection, discussed with reference to FIG. 1, are known to the prior art. It is also known to use variable elements for, or in addition to, the circuit elements illustrated in FIG. 1. The present invention uses such a variable element, a potentiometer, in a way which is novel and which provides advantages over prior art devices.

Known circuit elements have temperature coefficients which may vary from element to element. Thus, changing conditions may alter the relationships between the circuit elements and, accordingly, the condition of the bridge, dependent upon the thermal characteristics of the elements. The present invention reduces the effects of changes in conditions by replacing the resistance elements of two of the bridge legs with a conductive plastic potentiometer, the potentiometer establishing at least part of the resistance within each of the two legs. In this way, a ratio between the resistances of the legs may be adjusted by adjusting the potentiometer. In addition, while a potentiometer may have a significant temperature coefficient, it will maintain the established ratio to a greater tolerance. One potentiometer that has been employed within the present invention has a temperature coefficient of approximately ±500 ppm/°C. while it holds a set ratio to within approximately ±20 ppm/°C. In addition, the present invention allows the operation of the bridge, as well as a measurement of the resistance of the sensor.

DETAILED DESCRIPTION OF THE PREFERRED EMBODIMENTS

Figure 1:
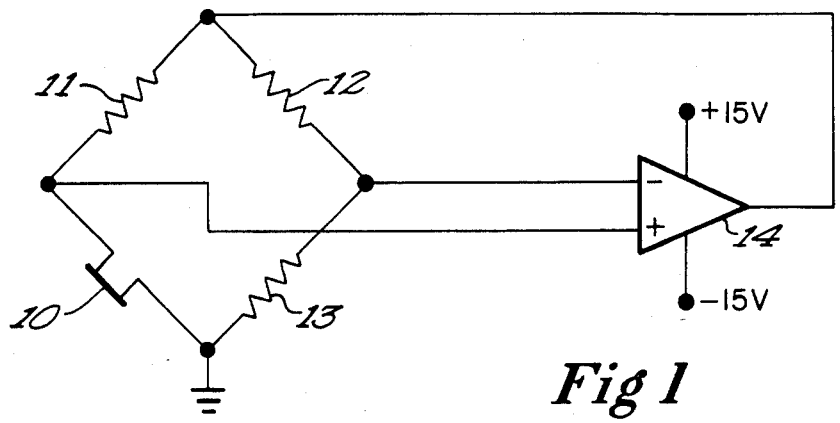
FIG. 1 illustrates a prior art constant temperature anemometer.
Figure 2:
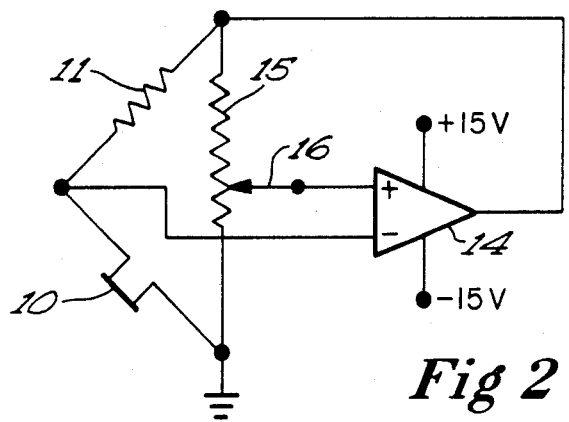
FIG. 2 illustrates a modification to the constant temperature anemometer of FIG. 1 in accordance with the present invention.

FIG. 2 illustrates a preferred embodiment of the present invention in the form of a modification of the prior art embodiment of FIG. 1. Throughout the Figures, like reference numerals designate like circuit elements. In FIG. 2, a leg of the anemometer bridge circuit containing the sensor 10 is serially connected with a leg containing a resistor 11, the junction between the legs of sensor 10 and resistor 11 being connected to the inverting input terminal of operational amplifier 14. However, in the embodiment of FIG. 2, the third and fourth legs are formed by a potentiometer 15, the potentiometer 15 including a wiper arm 16 connected to the non-inverting terminal of the operational amplifier 14. Potentiometer 15 establishes the third and fourth leg resistance and provides for simultaneous adjustment of those resistances. Additionally, the potentiometer 15 can hold a closer "ratio" tolerance than it can a resistance value on changes in temperature. In this manner, the use of a potentiometer provides greater stability to the circuit. The contact resistance of the wiper arm 16 has little effect on the overall system in that the operational amplifier 14 has a high input impedance.

In addition to greater temperature stability, as noted above, the embodiment of FIG. 2 also allows a determination of the operating resistance of the bridge circuit, as well as a measurement of the resistance of the sensor 10. Normally, the resistance of resistors 11–13 (see FIG. 1) establishes the operating resistance of the sensor circuit. However, inasmuch as a single adjustment establishes two of those resistances in the embodiment of FIG. 2, a measurement of the ratio of the two resistances established by the potentiometer in the embodiment of FIG. 2 provides the actual operating resistance dependent only on the resistor 11.

Figure 3:
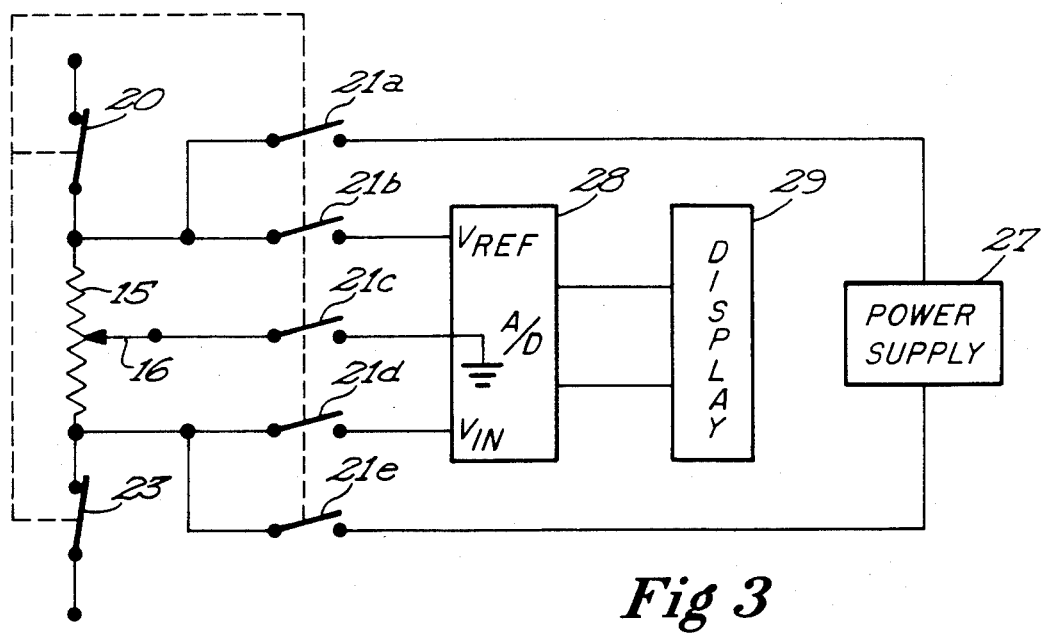
FIG. 3 illustrates an extension of the preferred embodiment of FIG. 2.

FIG. 3 illustrates a modification of the embodiment of FIG. 2 and includes only the third and fourth legs of the bridge circuit in the form of the potentiometer 15. The upper end of potentiometer 15 is connected to a switch 20 and to a pair of switch arms 21a and 21b—of a five pole double throw switch 21. Similarly, the lower end of potentiometer 15 is connected to a switch 23 and to a pair of switch arms 21d and 21e. The wiper arm 16 is connected to a switch arm 21c. Switch contacts for switch arms 21a and 21e are connected to a power supply 27, while contacts for switch arms switches 21b, 21d and 21c are connected to an analog-to-digital converter 28. Switch 21b is connected to the $V_{REF}$ terminal of converter 28, while switch 21d is connected to the $V_{IN}$ terminal of the converter. Switch 21c is connected to the ground terminal of converter 28. The output of converter 28 is connected to an LED display 29.

The analog-to-digital converter 28 may be of the type described in the INTERSIL Data Book. 10710 North Tantau Avenue, Coopertino, Calif. 95014, on page 4-139 et al. for an ICL 8052/ICL71CD3 chip. The LED display 29 is disclosed schematically connected to the analog-to-digital converter 28 on pages 4-143 and 4-147 of the publication.

As connected, the analog to digital converter 28 will provide, as an output, a ratio of the signal applied through switch 21d to that applied through switch 21b. With switches 21a, 21b and 21c, 21d and 21e closed while switches 20 and 23 are open, this corresponds to a ratio of the voltage of that part of potentiometer 15 corresponding to resistor 12 and 13. If the power supply 27 is a constant voltage power supply, this corresponds directly to a ratio of resistances from which the operating resistance of the bridge circuit of FIG. 2 can be directly determined. Indeed an LED display, such as at 29, may be employed to provide a direct readout of operating resistance. By closing switches 20 and 23 and opening the remaining switches (21a–21e), the bridge may be balanced by moving the wiper arm 16 of potentiometer 15. At that point, switches 20 and 23 may be opened and the other switches closed to provide a direct readout of the resistance of the sensor 10 (taking into account the resistance of the resistor 11). Sensor 10 may be of the type described in the 1978 catalogue of TSI Incorporated, 500 Cardigan Road, P.O. Box 43394, St. Paul, Minn. 55164 on pages 33–75.

Obviously, many modifications and variations of the present invention are possible in light of the above teachings. For example, a potentiometer may be used to provide the resistance elements in each of two bridge circuit legs. It is, therefore, to be understood that, within the scope of the appended claims, the invention may be practiced otherwise than as specifically described.

What is claimed is:

1. In a constant temperature anemometer of the type having bridge circuit means including first and second leg means serially connected to each other at a first junction, third and fourth leg means serially connected to each other at a second junction and connected in parallel with said first and second leg means at a third junction between said first and fourth leg means, said first leg means including sensor means and said second, third and fourth leg means including resistance means, and also having feedback amplifier means having its inputs interconnected with said first and second junction and its output interconnected with said third junction, the improvement comprising a voltage ratioing means, power supply means and means selectively interconnecting said third and fourth leg means within said bridge circuit means and with said voltage ratioing means and said power supply means, and wherein said resistance means of said third and fourth leg means comprise potentiometer means having a wiper arm, said wiper arm establishing said second junction.

2. The constant temperature anemometer of claim 1 wherein said voltage ratioing means comprises analog-to-digital converter means coupled to a display means.

3. The constant temperature anemometer of claim 1 further comprising means for determining the resistance ratio of said potentiometer and means selectively interconnecting said potentiometer within said bridge circuit means and with said ratio determining means.

4. The constant temperature anemometer of claim 1 further comprising means selectively connectable with said third and fourth leg means for determining the operating resistance of said bridge circuit means.

5. The constant temperature anemometer of claim 1 further comprising means selectively connectable with said third and fourth leg means for determining the resistance of said sensor means.

* * * * *

UNITED STATES PATENT AND TRADEMARK OFFICE
CERTIFICATE OF CORRECTION

PATENT NO. : 4,503,706
DATED : Mar. 12, 1985
INVENTOR(S) : Kenneth J. Kolodjski

It is certified that error appears in the above-identified patent and that said Letters Patent are hereby corrected as shown below:

On the Title Page at (73) Assignee: Kenneth J. Kolodjski, Minneapolis, Minnesota should be corrected to read --TSI Inncorporated, St. Paul, Minnesota 55164--.

Signed and Sealed this

Fifth Day of August 1986

[SEAL]

*Attest:*

DONALD J. QUIGG

*Attesting Officer*  *Commissioner of Patents and Trademarks*